United States Patent
Russell et al.

(10) Patent No.: US 6,751,737 B1
(45) Date of Patent: Jun. 15, 2004

(54) MULTIPLE PROTECTED MODE EXECUTION ENVIRONMENTS USING MULTIPLE REGISTER SETS AND META-PROTECTED INSTRUCTIONS

(75) Inventors: Richard G. Russell, Austin, TX (US); David F. Tobias, Pflugerville, TX (US)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/413,965

(22) Filed: Oct. 7, 1999

(51) Int. Cl.[7] .................................. G06F 1/24
(52) U.S. Cl. ................. 713/200; 713/168; 713/193; 713/201
(58) Field of Search ................ 713/200, 168, 713/193, 201

(56) References Cited

U.S. PATENT DOCUMENTS

| | | | |
|---|---|---|---|
| 5,109,413 A | * 4/1992 | Comerford et al. ........... | 705/54 |
| 5,946,674 A | * 8/1999 | Nordin et al. ................ | 706/13 |
| 5,974,142 A | * 10/1999 | Heer et al. .................. | 379/442 |

OTHER PUBLICATIONS

*Protected Mode Basics*, Robert Collins, ©1991–1999, 10 pgs.
*The virtual machine*, http://www.object–tools.com/dm/dm-virtua.htm, Apr. 9, 1999.
*Enhanced Am486®DX Microprocessor Family*, Advanced Micro Devices, Inc., Mar. 1997, 2pgs.
*The Z80 Microprocessor*, http://www.geocities.com/Silcon Valley/5711/z80.html, Dec. 2, 1998, 6 pgs.
*PIC16C84: 8–Bit CMOS EEPROM Microcontroller*, Microchip Technology, Inc., ©1996, pp. 1–116.
*comp.emulators.misc Frequently Asked Questions (FAQ)* [1/3], Adam Roach, ©1995, 1996, 1997, http://www.cis.ohio–state.edu/hypertext/faq/usenet/emulators–faq/part1/faq.html, [1/3] 34 pgs.; [2/3] 34 pgs.; [3/3] 31 pgs.
*Am486™DX/DX2 Microprocessor, Hardware Reference Manual, E86™ Family*, Advanced Micro Devices, Inc. , Rev. 1, 1993, pp. 3–1 through 3–3, 4–1 through 4–35, 5–1 through 5–6, and 6–1.

* cited by examiner

Primary Examiner—Thomas R. Peeso
(74) Attorney, Agent, or Firm—Akin Gump Strauss Hauer & Feld LLP

(57) ABSTRACT

A system is provided that contains multiple control register and descriptor table register sets so that an execution context switch between X86 protected mode operating systems can be performed with minimal processing overhead. Upon receipt of a protected instruction determined to be a meta-protected instruction, the system calls a meta virtual machine (MVM) that performs the functions necessary to shift execution contexts.

17 Claims, 7 Drawing Sheets

MULTIPLE PROTECTED MODE EXECUTION ENVIRONMENTS USING MULTIPLE REGISTER SETS AND META-PROTECTED INSTRUCTIONS

BACKGROUND OF THE INVENTION

1. Field of the Invention

The present invention relates generally to a method of employing multiple execution environments within a computer system and, more particularly, to a method that utilizes meta protected instructions to switch the entire context of a microprocessor between multiple hardware execution environments.

2. Description of the Related Art

Originally, computers were custom designed to perform a single task such as accounting, inventory control or trajectory calculation. Each system was sold to fit a particular purpose and was programmed with software that was not suited for use with any other computer or task. The advantages of hardware and software standardization soon became apparent.

When the early computer companies began producing multiple processing devices based upon the same design, it became possible to reuse portions of computer software as well. This development lead to the creation of operating systems (OSs), a collection of software that handles elementary computer functions such as reading keyboard input, producing video display output and reading and writing instructions and data from memory. In short, the OS is the program that "runs" the computer.

The standardization of OSs enabled multiple applications to be written that could run on the same computer. The early computers were very expensive, so designers developed methods to allow multiple users to share the expense. This cooperation, or "timesharing," was informal and procedural at first, for example sales staff using the computer during the day for point-of-sale (POS) transactions and the accounting department using the computer at night for billing. It was not long before computers and OSs were developed to support more advanced timesharing schemes.

Operating systems, such as UNIX developed by AT&T Bell Laboratories of Murray Hill, N.J., enable multiple users and multiple programs to access computer resources by means of a process called "multitasking" in a fashion that appears simultaneous to users. Multitasking is typically accomplished by a method called task switching, which often utilizes "time slicing." The UNIX OS divides the available processor time into slices and allows each application or user a slice. If a program has reached the end of its time slice without finishing its processing, hardware and software variables such as instruction and data registers are saved so that they can be restored when the interrupted application's turn comes around again and it resumes processing. The entire process is also called "context switching" although this term also can refer to the practice of switching between active applications on a computer desktop windowing system such as the Windows OS published by Microsoft Corporation of Redmond, Wash.

One problem that arises on a multitasking computer system is incompatibility of programs. For example, although a computer can run multiple programs, it is difficult to simultaneously run one program designed for the Windows OS and another program designed for UNIX. Typically, a computer system must be running one OS or another but not both. If two OS-incompatible programs need to be run at the same time, an "emulator" is often used. An emulator translates commands for one OS to another. One problem is that a program utilizing an emulator typically runs much slower than it would otherwise.

Another problem that arises in a multitasking environment is memory management. A multitasking OS should ensure that an application does not inadvertently corrupt the memory space of another application or the OS itself. Early personal computers (PCs) ran only one program at a time and operated in "real" mode. In "real" mode, a memory request contains only the address that needs to be accessed and the OS retrieves the requested memory directly. Current OSs typically operate in a "protected" mode, which means that a memory request does not point to a specific area of memory but contains an index into a "descriptor" table. A descriptor table entry contains the actual address of the requested memory. Included within a descriptor table entry are "access" bits that specify an access level, typically a value between 0 and 3, that a requesting process is required to have to access that specific memory location. The OS compares the access bits sent with the memory request with the access bits in the descriptor table entry. For example, a memory request with the access bits set to a 3 cannot access a memory space that has an access level of 0. An access level of 3 may also indicate to the operating system that the requesting application is not allowed to access memory that is owned by another application, thus preventing one application from corrupting the memory space of another with the same access level.

SUMMARY OF THE INVENTION

Briefly, a microprocessor provides a process that switches the microcontroller between multiple protected mode execution contexts or environments by employing "meta protected" instructions ("meta instructions") and multiple registers sets. Although some processors such as the Z80 manufactured by Zilog Corporation of Campbell, Calif., contain multiple data register sets, current microprocessors have only a single set of control registers and active descriptors, limiting the microprocessor to maintaining a single execution environment at any particular time. Here, a meta virtual machine (MVM) is provided to emulate multiple protected mode sessions by managing the time between different protected mode execution contexts. The system thereby appears to provide multiple processors existing at the same time.

A meta protected instruction contains information indicating to a microprocessor that a specific execution context is required or preferred. Upon receipt of the meta instruction, the microprocessor switches to a special context called a meta virtual machine (MVM). The MVM then executes a series of instructions that switch the microprocessor to the required or preferred execution context, thus enabling the microprocessor to execute the instruction in the proper execution context.

One advantage of this technique is that instructions that either cannot execute or execute inefficiently in one execution environment can be supported in an efficient manner by a different execution environment, eliminating the need for an emulator. For example, a user might run Microsoft Word published by Microsoft Corporation using the Microsoft Windows OS on a UNIX-based web server. Utilizing the context switch, each operating system views itself as the only operating system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
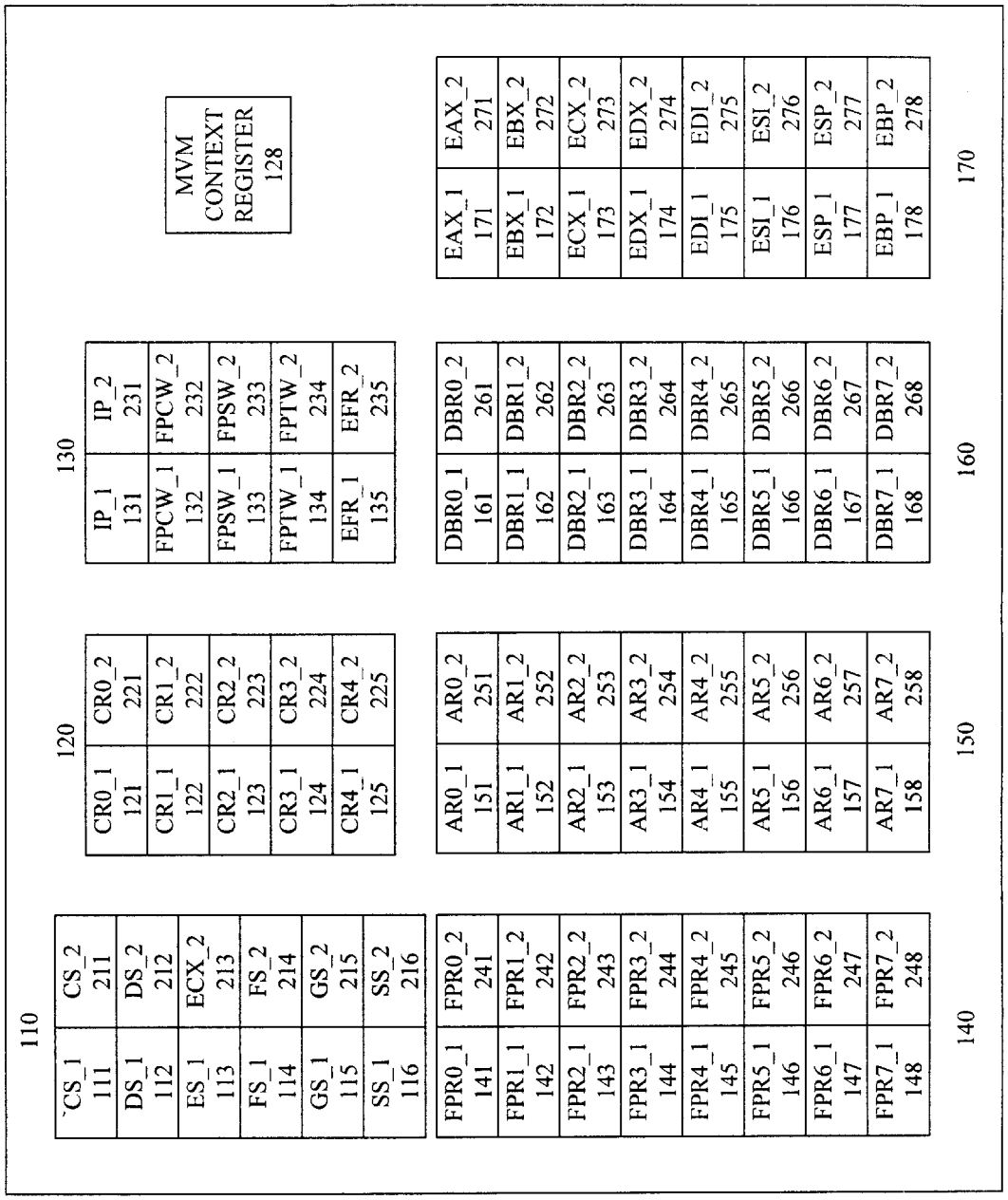
FIG. 1 is a block diagram of a microprocessor showing an exemplary set of data and control registers.

Turning to FIG. 1, shown is a block diagram of data and control registers of a typical microprocessor P implemented according to the disclosed techniques. The microprocessor P in the disclosed embodiment is compatible with the Am186 instruction set implemented in a variety of microprocessors from Advanced Micro Devices, Inc., of Sunnyvale, Calif. It should be understood that a variety of microprocessors could be used (e.g., X86 and others).

Illustrated within the microprocessor P are a set of segment registers 110, a set of control registers 120, a set of miscellaneous registers 130, a set of floating point registers 140, a set of auxiliary registers 150, a set of debug registers 160, a set of general purpose registers 170 and a meta virtual machine (MVM) control register 128. The set of segment registers 120 includes two code segment registers, CS_1 111 and C S_2 211 and eight data segment registers, DS_1 112, DS_2 212, ES_1 113, ES_2 213, FS_1 114, FS_2 214, GS_1 115 and GS_2 215. Instructions are typically stored in the code segment registers CS_1 111 and CS_2 211 and data is typically stored in the data segment registers, DS_1 112, DS_2 212, ES_1 113, ES_2 213, FS_1 114, FS_2 214, GS_1 115 and GS_2 215. Also included in the segment registers 110 are two stack segment registers, SS_1 116 and SS_2 216, where the microprocessor's stack pointers are stored.

The set of control registers 120 includes 10 control registers, CR0_1 121, CR0_2 221, CR1_1 122, CR1_2 222, CR2_1 123, CR2_2 223, CR3,1 124, CR3_2 224, CR4_1 125 and CR4_2 225. The set of miscellaneous registers 130 includes two instruction pointers, IP_1 131 and IP_2 231, two floating point control word registers, FPCW_1 132 and FPCW_2 232, two floating point status word registers, FPSW_1 133 and FPSW_2 233, two floating point tag word registers, FPTW_1 134 and FPTW_2 234, and two EFAGS registers EFR_1 135 and EFR_2 235. The floating point registers, FPCW_1 132, FPCW_2 232, FPSW_1 133, FPSW_2 233, FPTW_1 134 and FPTW_2 234, along with the set of floating point registers 140 enable an execution unit (not shown) within the microprocessor M to perform mathematical operations on non-integer numbers. The set of floating point registers 140 is comprised of eight numeric floating point registers, FP0_1 141, FP0_2 241, FP1_1 142, FP1_2 242, FP2_1 143, FP2_2 243, FP3_1 144, FP3_2, 244, FP4_1 145, FP4_2 245, FP5_1 146, FP5_2 246, FP6_1 147, FP6_2 247, FP7_1 148 and FP7_2 248.

The set of auxiliary registers 150 includes sixteen registers, AR0_1 151, AR0_2 251, AR1_1 152, AR1_2 252, AR2_1 153, AR2_2 253, AR3_1 154, AR3_2 254, AR4_1 155, AR4_2 255, AR5_1 156, AR5_2 256, AR6_1 157, AR6_2 257, AR7_1 158 and AR7_2 258. The set of auxiliary registers facilitate the processing of multimedia software.

The set of debug registers 160 includes sixteen registers, DBR0_1 161, DBR0_2 261, DBR1_1 162, DBR1_2 262, DBR2_1 163, DBR2_2 263, DBR3_1 164, DBR3_2 264, DBR4_1 165, DBR4_2 265, DBR5_1 166, DBR5_2 266, DBR6_1 167, DBR6_2 267, DBR7_1 168 and DBR7_2 268. The set of debug registers facilitate the debugging of software by storing information relating to global and local software breakpoints.

The set of general purpose registers 170 includes sixteen registers, EAX_1, 171, EAX_2 271, EBX_1, 172, EBX_2 272, ECX_1, 173, ECX_2 273, EDX_1, 174, EDX_2 27 EDI_1 175, EDI_2 275, ESI_1 176, ESI_2 276, ESP_1 177, ESP_2 277, EBP_1 178, and EBP_2 278. Generally, the set of general purpose registers 170 are used to hold integer data or memory pointers used by computer instructions. More specifically, EAX_1 171 and EAX_2 271 are typically employed as accumulators. EBX_1, 172 and EBX_2 272 are typically store pointers to memory locations. ECX_1, 173 and ECX_2 273 are typically store loop counters. EDX_1 174 and EDX_2 274 are typically store hold input/output (I/O) information parameters passed between software subroutines. EDI_1 175 and EDI_2 275 are typically store destination pointers for the ES_1 113 and the ES_2 213 segment registers respectively. ESI_1 176 and ESI_2 276 are typically store source pointers used by DS_1 112 and DS_2 212 respectively. ESP_1 177 and ESP_2 277 are typically store pointers to a software's stack segment. EBP_1 178 and EBP_2 278 are typically employed to point to data within the stack segments pointed to by ESP_1 177 and ESP_2 277 respectively.

Finally, as will be described in more detail below, the MVM context register 128 is employed in accordance with the techniques disclosed herein.

The numbers and types of registers contained within the microprocessor M are not critical for the purposes of the present invention. The microprocessor M may contain more, fewer, or different registers without detracting from the spirit of the invention. In addition, it is not critical that all registers be employed. In other embodiments, a subset or superset of the disclosed registers or different registers can be employed.

Figure 2:
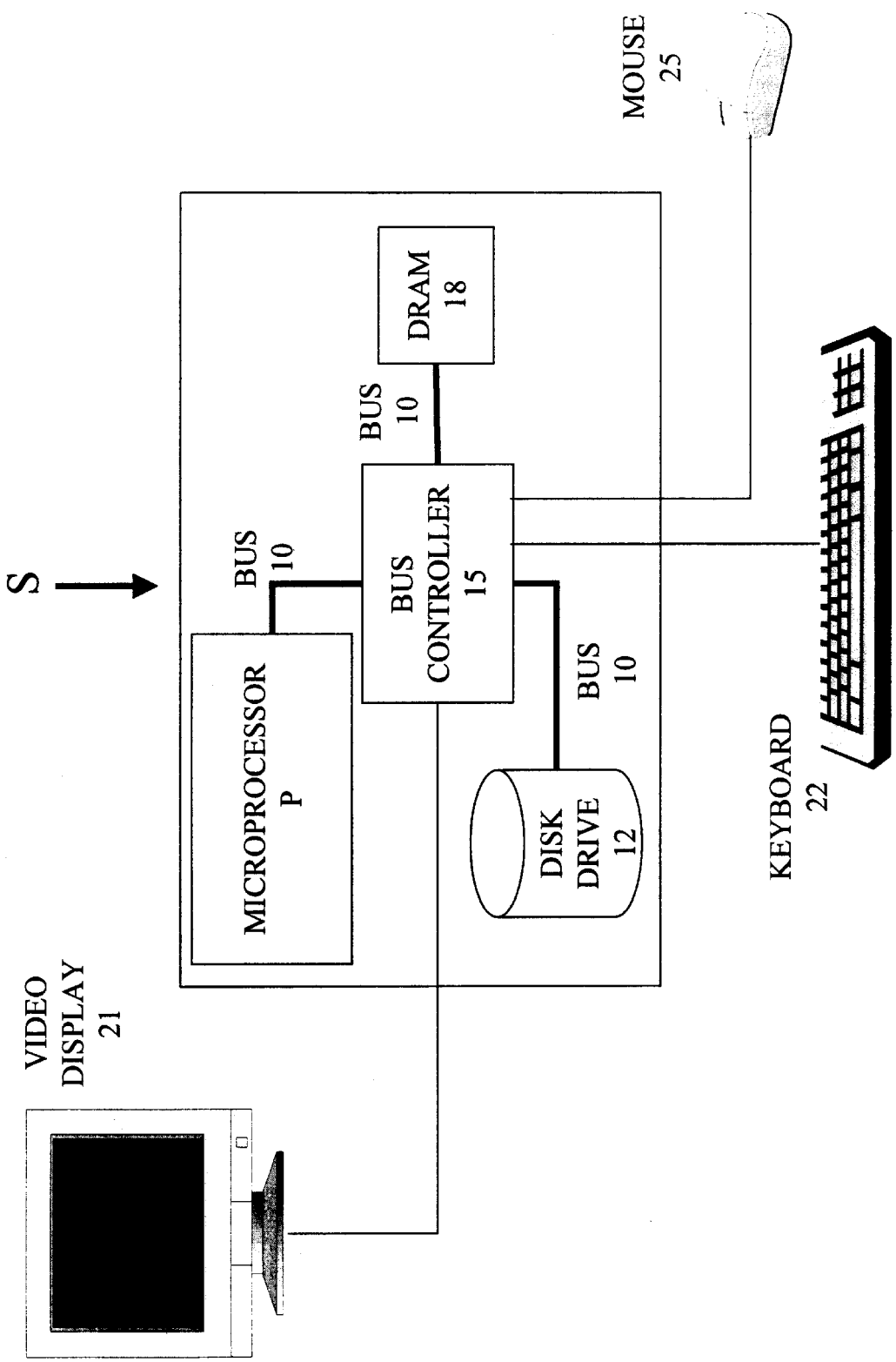
FIG. 2 is a block diagram of a typical computer system employing the microprocessor of FIG. 1.

Turning now to FIG. 2, illustrated is a computer system S. In the disclosed embodiment, the computer system S is a machine configured around the bus 10 connected to the microcontroller or microprocessor M and a bus controller 15. Also included within the computer system S and connected to the bus 10 is dynamic random access memory (DRAM) 18 and a disk drive 12. Finally, a video display 21, a keyboard 22 and a mouse 25 are connected to the computer system S through circuitry in the bus controller 15, enabling human interaction with the computer system S.

Figure 3:
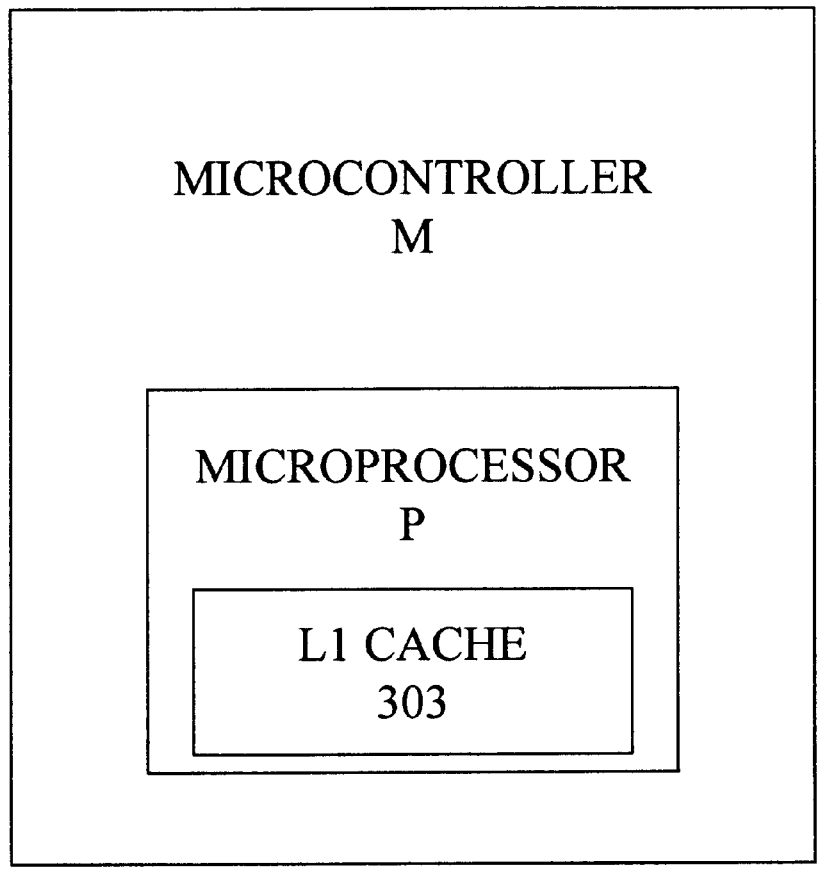
FIG. 3 is a block diagram showing an exemplary relationship between the microprocessor of FIGS. 1 and 2 and a microcontroller.

Turning now to FIG. 3, illustrated is a relationship between the microcontroller M and a microprocessor P. A microcontroller typically includes a microprocessor. The techniques and circuitry disclosed herein can be applied to a wide variety of microprocessors and also microcontrollers. Included within the microprocessor M is a level 1 (L1) cache 303. The term "microcontroller" itself has differing definitions in industry. Some companies refer to a processor core with additional features (such as I/O) as a "microcontroller" if it has no onboard memory, and digital signal processors (DSPs) are now used for both special and general purpose controller functions. As here used, the term "microcontroller" covers all of the products, and generally means an execution unit such as the microprocessor P with added functionality all implemented on a single monolithic integrated circuit.

Figure 4:
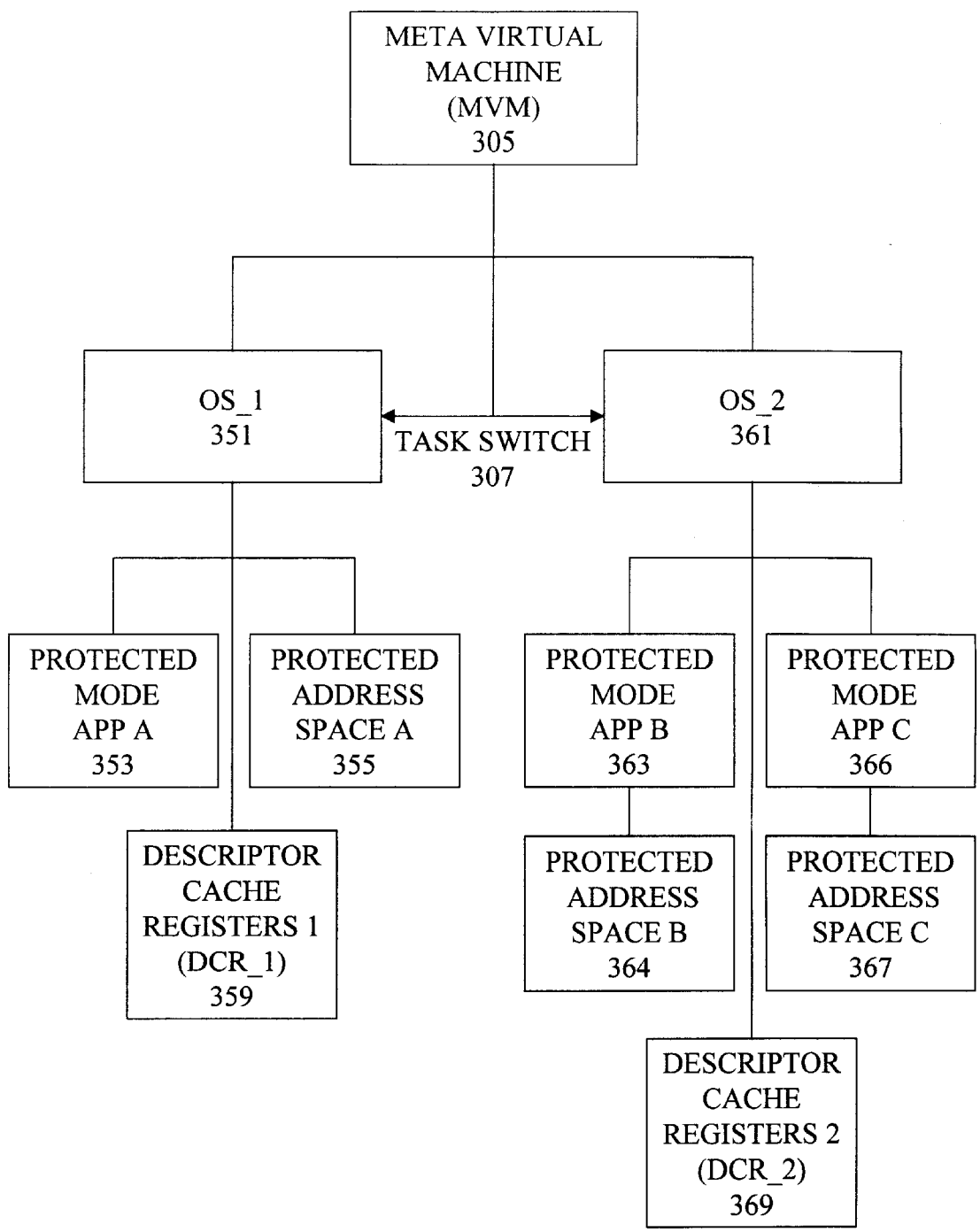
FIG. 4 is a block diagram of a meta virtual machine (MVM) illustrating its exemplary relationship to different operating systems.

Turning now to FIG. 4, illustrated is a meta virtual machine (MVM) 305 and two operating systems, an operating system 1 (OS_1) 351 and an operating system 2 (OS_2) 361. OS_1 351 and OS_2 361 typically are stored in the DRAM 18 and run on the microcontroller M. The MVM 305 implements a task switch 307 to selectively switch the microprocessor M between OS_1 351 and OS_2 361.

OS_1 351 is running a protected mode application A 353 having a protected mode address space A 355. In addition, OS_1 employs descriptor cache registers 1 (DCR_1) 359. OS_2 361 is running a protected mode application B 363 in a protected address space B 364 and a protected mode application C 366 in a protected mode address space C 367. In addition, OS_2 361 employs descriptor cache registers 2 (DCR_2) 369.

Figure 5:
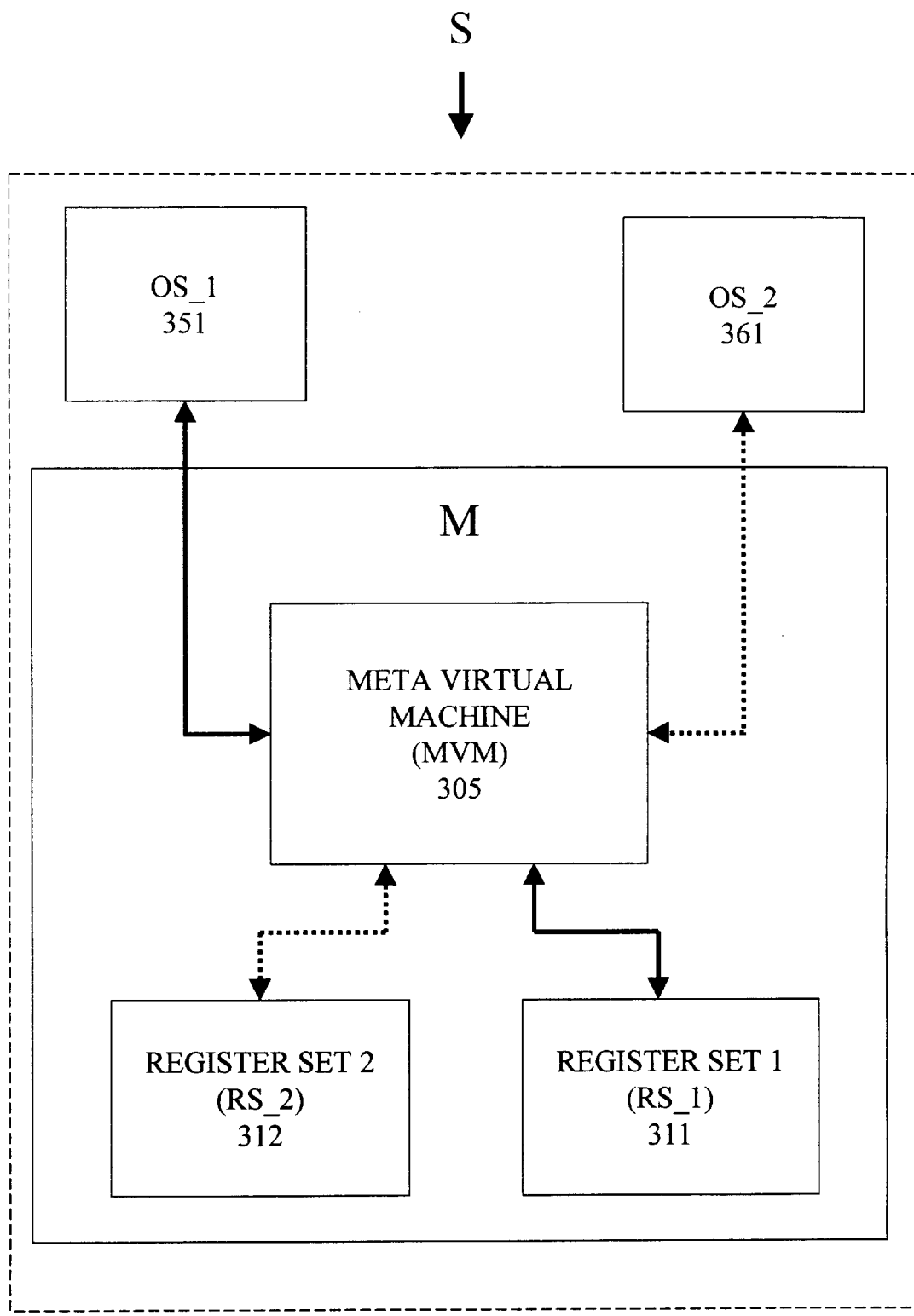
FIG. 5 is a block diagram further illustrating the nature of the MVM of FIG. 4.

Turning now to FIG. 5, illustrated is the MVM 305 incorporated in the microprocessor M. The microprocessor M is also shown as part of the computer system S. In this embodiment, the microprocessor M is running two operating systems OS_1 351 and OS_2 361. For purposes of this example, the OSs 351 and 361 may be two operating systems such as Windows published by Microsoft Corporation and SCO UNIX published by Santa Cruz Operation Corporation of Santa Cruz, Calif.

In the microprocessor M running multiple OSs, the first step in a context switch is to have the microprocessor M save the values of all its registers. Here, this step is unnecessary because the microprocessor M retrieves a protected instruction, determines whether it is a meta instruction and, if so, invokes the MVM 305. The MVM 305, in response to the meta instruction, switches to the appropriate set of registers. In this example, OS_1 351 employs a register set 1 (RS_1) 311 and OS_2 361 employs a register set 1 (RS_2) 312. In this example, RS_1 311 includes the segment registers CS_1 111, DS_1 112, ES_1 113, FS_1 114 GS_1 115, SS_1 116, the control registers CR0_1 121, CR1_1 122, CR2_1 123, CR3_1 124, CR4_1 125, the miscellaneous registers IP_1 131, FPCW_1 132, FPSW_1 133, FPTW_1 134, EFR_1 135, the floating point registers FPR0_1 141, FPR1_1 142, FPR2_1 143, FPR3_1 144, FPR4_1 145, FPR5_1 146, FPR6_1 147, FPR7_1 148, the auxiliary registers AR0_1 151, AR1_1 152, AR2_1 153, AR3_1 154, AR4_1 155, AR5_1 156, AR6_1 157, AR7_1 158, the debug registers DBR0_1 161, DBR1_1 162, DBR2_1 163, DBR3_1 164, DBR4_1 165, DBR5_1 166, DBR6_1 167, DBR7_1 168, and the general purpose registers EAX_1 171, EBX 1 172, ECX_1 173, EDX_1 174, EDI 1175, ESI_L 176, ESP_1 177 and EBP_1 178.

The second register set, RS_2 312, includes the segment registers CS_2 211, DS_2 212, ES_2 213, FS_2 214 GS_2 215, SS_2 216, the control registers CR0_2 221, CR0_2 222, CR2_2 223, CR3_2 224, CR4_2 225, the miscellaneous registers IP_2 231, FPCW_2 232, FPSW_2 233, FPTW_2 234, EFR_2 235, the floating point registers FPR0_2 241, FPR1_2 242, FPR2_2 243, FPR3_2 244, FPR4_2 245, FPR5_2 246, FPR6 2 247, FPR7_2 248, the auxiliary registers AR0_2 251, AR1_2 252, AR2 2 253, AR3_2 254, AR4_2 255, AR5_2 256, AR6_2 257, AR7_2 258, the debug registers DBR0_2 261, DBR1_2 262, DBR2_2 263, DBR3_2 264, DBR4_2 265, DBR5_2 266, DBR6_2 267, DBR7_2 268, and the general purpose registers EAX_2 271, EBX_2 272, ECX_2 273, EDX_2 274, EDI_2 275, ESI_2 276, ESP_2 277 and EBP_2 278.

The microprocessor M contains circuitry to access the appropriate register set, RS_1 311 or RS_2 312, depending upon which OS, OS_1 351 or OS_2 361 respectively, is initiating the request. In addition to multiple register sets RS_1 311 and RS_312, the MVM 305 may contain separate descriptor tables for the OSs, OS_1 351 and OS_2 361. With separate descriptor tables, OS_1 351 and OS_2 361 can each access separate, compatible or incompatible address spaces.

It is not critical to the present invention how the information identifying a protected instruction as a meta instruction is communicated to the microprocessor M. For example, the execution context information may be encoded in a bit or bits of the op code of the protected instruction or in an address that accompanies the protected instruction with the bit(s) set at compile time by the setting of a compiler option. In another embodiment, the bit(s) may be set at load or runtime in a manner similar to the techniques employed to resolve relative addresses when typical object code is loaded or run.

The precise implementation of the execution context switch is not critical. For example, it can be implemented in microcode or hard circuitry. In addition, the additional registers and descriptor tables may be separate circuitry or simply a software implemented partition of existing registers and descriptor tables. In addition the additional registers and descriptor tables can be implemented in the L1 cache 303.

Figure 6:
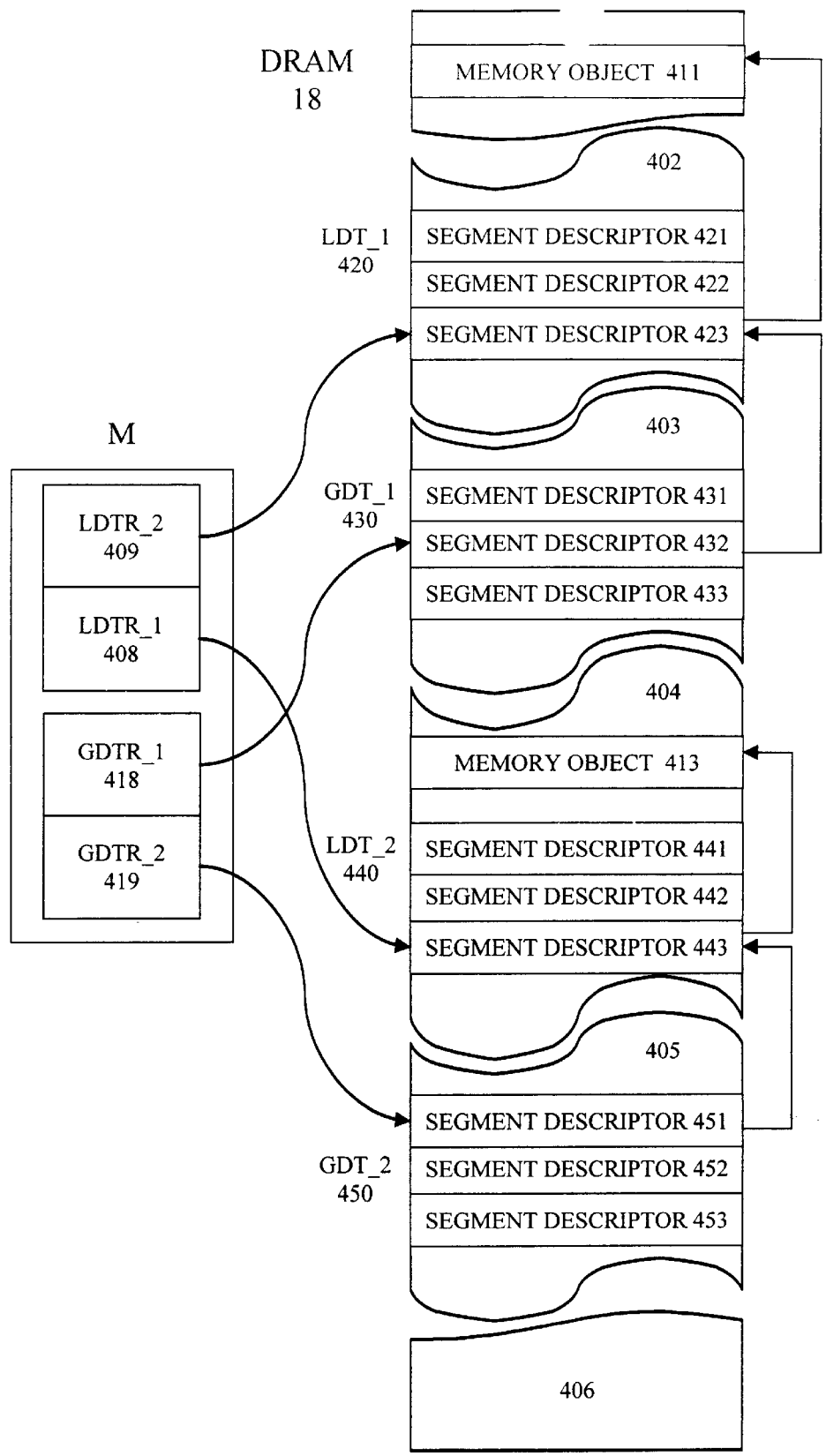
FIG. 6 is a block diagram showing the global and local descriptor tables of the microprocessor of FIGS. 1–3.

Turning now to FIG. 6, illustrated are two global descriptor table registers, GDTR_1 418 and GDTR_2 419, two local descriptor table registers, LDTR_1 408 and LDTR_2 409, and sections 401–406 of the DRAM 18 implemented according to the disclosed techniques. The sections 401–406 of the DRAM 18 may be adjacent or non-adjacent and are not shown in any particular order.

Contained in section 401 of DRAM 18 is a memory object 411. Contained within section 402 of the DRAM 18 is a portion of a local descriptor table (LDT_1) 420 containing segment descriptors 421–423. A typical local descriptor table may contain several thousand segment descriptors. Contained within section 403 is a portion of a global descriptor table (GDT_1) 430 containing segment descriptors 431–433. Similar to a local descriptor table, a global descriptor table typically holds many more than three entries. Contained within section 404 is a portion of a second local descriptor table (LDT_2) 440 containing segment descriptors 441–443 and a memory object 413. Contained within section 405 is a portion of a local descriptor table (GDT_2) 450 containing segment descriptors 451–453.

The local and global descriptor tables, LDT_1 420, LDT_2 440, GDT_1 430, and GDT_2 450, are used to map memory requests for the microprocessor M. In a protected memory mode, the values in LDTR_1 408, LDTR_2 409, GDTR_1 418 and GDTR_2 419 point to segment descriptors in LDT_1 420, LDT_2 430, GDT_1 440 and GDT_2 450 respectively. For example, GDTR_1 418 points to segment descriptor 432 in GDT_1 430, GDTR_2 419 points to segment descriptor 451 in GDT_2 450, LDTR_1 408 points to segment descriptor 443 in LDT_2 440 and LDTR_2 409 points to segment descriptor 423 in LDT_1 420. A base address and an offset is stored within each segment descriptor 441–443 of GDT_1 440 and segment descriptor 451–453 of GDT_2 450. Each segment descriptor 441–443 and 451–453 also contains additional information such as access bits. A base value and the offset value in the segment descriptors 421–423, 431–433, 441–443 and 451–453 are used to calculate an address in the DRAM 18. In this example, a base value and a offset value in GDTR_2 419 points to segment descriptor 451 in GDT_2 450, which points to segment descriptor 443 in LDT_2 440. Segment descriptor 443 then points to memory object 413 in segment 404.

As long as a switch between multiple processing contexts is supported, the specific memory management scheme employed by microprocessor M is not critical. The example scheme in FIG. 6 illustrates the utilization of multiple local and global addresses tables so that the microprocessor M can shift between multiple processing contexts such as applications and OS without significant overhead. A typical microprocessor contains only one global descriptor table register pointing to one global descriptor table. Here, multiple global descriptor tables are supported. For a computer system supporting two execution environments, one global descriptor table register, pointing to one global descriptor table, is associated with one execution environment and the another global descriptor table register, pointing to another global descriptor table, is associated with the other execution environment. It should be understood that the disclosed techniques are not limited to the use of applications and OSs as execution environments. In addition to address tables, the microprocessor M may include other duplicate register sets such as instruction and data registers. It should be understood that in addition to virtualizing the address space that the MVM 305 can be utilized to virtualize input/output (I/O) space, interrupts and the like.

Figure 7:
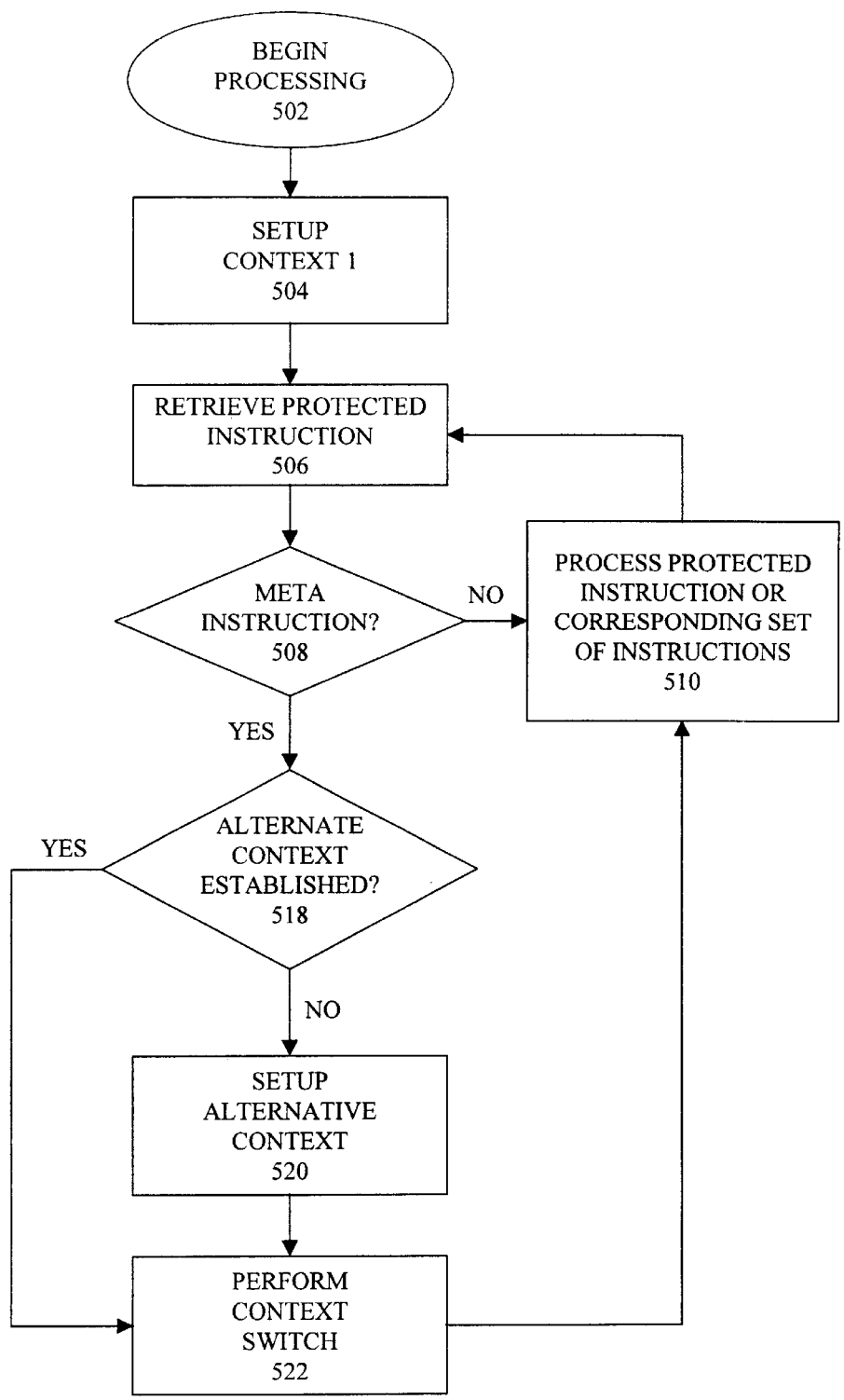
FIG. 7 is a flowchart diagram showing the processing of protected instructions in connection with the MVM of FIGS. 4 and 5.

Turning now to FIG. 7, illustrated is a flow diagram of a process 500 that runs on the microprocessor M and handles meta instructions. The process 500 begins with a Begin Processing step 502 and proceeds to a Setup Context 1 step 504 which creates a first execution context by selecting and writing appropriate values, as necessary, to LDTR_1 408, GDTR_1 418, and all the registers in RS_1 311. In addition, data is written to the MVM context register 128 indicating that the first execution environment is active. The MVM context register 128 may also contain data indicating whether the first execution environment and a second execution environment have been initialized and, if so, this data is written as well. Following the setup of the registers the microprocessor M activates or selects the first set of registers RS_1 311.

The values written depend upon the default requirements of the OS or software employing the first execution environment and may be retrieved either from a flash ROM device when an OS is booted or from the software itself. After the first execution context is established, the microprocessor M retrieves an instruction in step 506. In another embodiment, the step 504 may be performed after step 506 so that the first execution context loaded in the microprocessor M corresponds to the first instruction received in step 506.

Next, the process 500 determines in step 508 whether the protected instruction retrieved in step 506 is a meta instruction, requiring an execution context switch. In one embodiment, the process 500 compares bits within the instruction with the value stored in the MVM context register 128 in the microprocessor M. If the bits in the protected instruction do not match the bits in the MVM context register 128, the microprocessor M identifies the instruction as a meta instruction. If the retrieved instruction is not a meta instruction, the process 500 proceeds to step 510 where the protected instruction or a corresponding set of instructions are processed in the current execution context. Alternatively, a set of instructions corresponding to the protected instruction rather than the protected instruction itself may be executed. Next, control proceeds to step 506 where another protected instruction is retrieved, starting the cycle over again.

If the process 500 determines in step 508 that the protected instruction retrieved in step 506 is a meta instruction, which requires or prefers a different execution context than is currently running, then the process 500 proceeds to step 518 where the process 500 determine whether the execution context required or preferred by the meta instruction is already loaded in the alternative registers.

If the meta instruction corresponds to an execution context that is not currently loaded, then the process 500 proceeds to step 520 where the alternative execution context is established by writing, as needed, appropriate values to LDTR_2 409, GDTR_2 419 and the second set of registers comprising RS_2 312. In addition, data is written to the MVM context register 128 to indicate that the second or other execution context has been initialized and is active.

Although this example illustrates only two alternative execution contexts, in other embodiments there can be more. More than two execution contexts can be accommodated by additional register sets and descriptor tables or by "paging" the corresponding execution context information in and out of the registers. In other words, information corresponding to an execution context that is being deactivated may be stored in other memory such as DRAM 18 so that the information can be written back when another protected instruction retrieved in step 506 requires the information. In another embodiment, the execution context can be stored in the L1 cache 303.

Once the alternative execution context is established in step 520, the process 500 proceeds to step 522 where LDTR_2 409, GDTR_2 419 and the second set of registers RS_2 312 are selected by rendering the registers the controlling or active registers within the microprocessor M. It is not critical whether the selection in step 522 is performed by means of hardware or software. Following the completion of the context switch, the process 500 proceeds to step 510 where the protected instruction or a corresponding set of instructions are processed and then to step 506 to retrieve another protected instruction, starting the cycle over again.

If the process 500 determines in step 518 that the alternative execution context has already been established, it proceeds to step 522 where the context switch is performed as previously described and the MVM context register 128 is modified to indicate which execution environment, the first or the second, is active. Following the context switch in step 522, the process 500 proceeds to step 510 where the protected instruction or a corresponding set of instructions are processed and then to step 506 where another protected instruction is retrieved, starting the cycle over again.

The MVM 305 can emulate multiple X86 protected mode sessions by managing the time between different protected mode execution contexts. A system including the MVM 305 appears to provide multiple X86 processors coexisting. At the same time, the MVM 305, for example, can virtualize interrupts, address space or input/output (I/O) space. One use of the MVM 305 might be to in effect move information from one X86 protected mode space to a virtual clipboard and then to another X86 protected mode space. Using a shared address space similar to the virtual clipboard, the MVM 305 can provide interprocess communication protocols (IPCs) such as semaphores, pipes and sockets between different applications both in the same and different execution contexts.

Aside from meta instructions to switch between execution contexts, additional meta protected instructions can be employed to program and configure the MVM 305, provide specific debugging information for the MVM 305 and provide control over the L1 cache 303 which can store the execution contexts.

The foregoing disclosure and description of the various embodiments are illustrative and explanatory thereof, and various changes in the details of the illustrated apparatus and construction and method of operation including the number and the order of the processing steps may be made without departing from the spirit of the invention.

What is claimed is:

1. A method of switching between protected mode contexts for a microprocessor, comprising the steps of:

retrieving a protected instruction for processing;

determining whether the protected instruction is a meta instruction; and switching the microprocessor from a first protected mode context to a second protected mode context corresponding to the meta instruction.

2. The method of claim 1, the switching step comprising the step of:

loading the second protected mode context into the microprocessor.

3. The method of claim 1, further comprising the step of:

executing a set of instructions corresponding to the meta instruction in the second protected mode context.

4. The method of claim 1, wherein the first protected mode context and the second protected mode context comprise X86 protected mode operating systems.

5. The method of claim 1, wherein the first protected mode context and the second protected mode context are each associated with an address space.

6. The method of claim 1, wherein the first protected mode context and second protected mode context are each associated with a descriptor cache.

7. The method of claim 1, wherein the microprocessor is part of a microcontroller.

8. A processor-based device for supporting multiple protected mode contexts, comprising:

a microprocessor;

a first protected mode context coupled to the microprocessor;

a second protected mode context coupled to the microprocessor; and a meta-virtual machine coupled to the microprocessor, first protected mode context, and the second protected mode context for switching the processor-based device between the first protected mode context and the second protected mode context based on a protected instruction determined to be a meta instruction.

9. The processor-based device of claim 8, wherein the first protected mode context and the second execution context comprise X86 protected mode operating systems.

10. The processor-based device of claim 8, wherein the first protected mode context further comprises a first address space and the second hardware execution context further comprises a second address space.

11. The processor-based device of claim 8, wherein the first protected mode context is associated with a first set of descriptor cache and the second protected mode context is associated with a second set of descriptor cache.

12. The processor-based device of claim 8, wherein the microprocessor is part of a microcontroller.

13. A meta virtual machine, comprising:

code for receiving a protected instruction from a processor-based device;

code for switching a microprocessor of the processor-based system between a first protected mode context and a second protected mode context based on determining the protected instruction to be a meta instruction.

14. The meta virtual machine of claim 13, the code for switching the microprocessor comprises:

code for loading the second protected mode context into the microprocessor.

15. The meta virtual machine of claim 13, further comprising:

code for executing a set of instructions corresponding to the meta instruction in the second protected mode context.

16. The meta virtual machine of claim 13, wherein the first protected mode context and the second protected mode context are X86 protected mode operating systems.

17. The meta virtual machine of claim 16, wherein the microprocessor is part of a microcontroller.

\* \* \* \* \*